Figure 1:
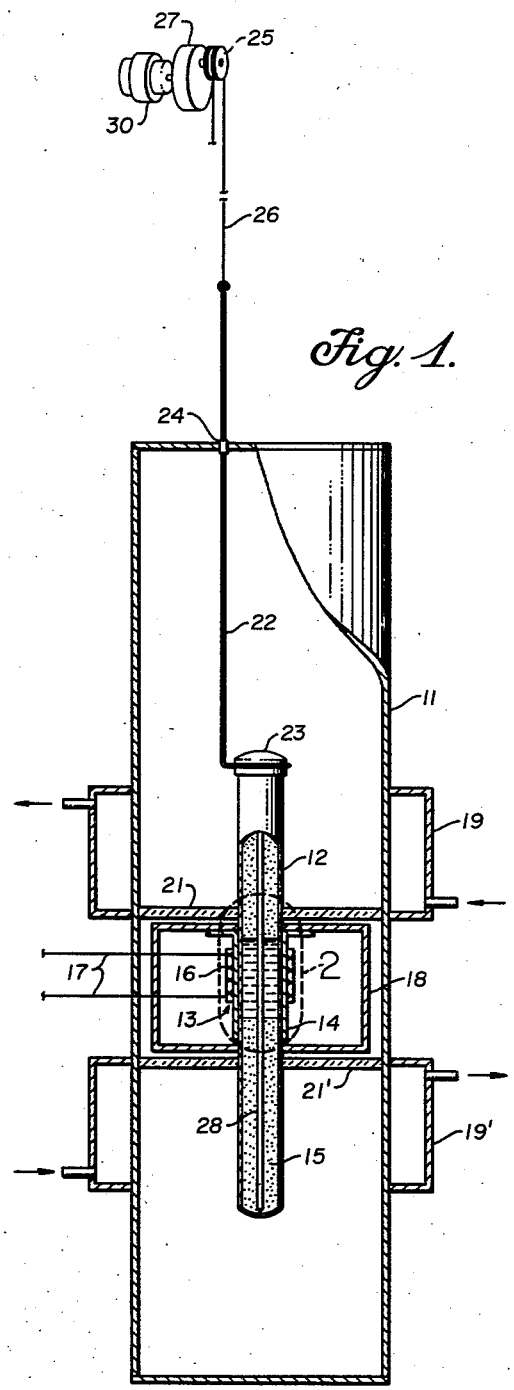

June 15, 1965  W. R. WILCOX  3,189,419
ZONE-MELTING CRYSTALLIZATION TECHNIQUE
Filed Aug. 2, 1961

INVENTOR.
WILLIAM R. WILCOX
BY
Roland A. Anderson
ATTORNEY.

3,189,419
ZONE-MELTING CRYSTALLIZATION TECHNIQUE

William R. Wilcox, Torrance, Calif., assignor to The United States of America as represented by the United States Atomic Energy Commission
Filed Aug. 2, 1961, Ser. No. 128,907
4 Claims. (Cl. 23—301)

The present invention relates to a method and apparatus for the accomplishment of more effective mixing in the solution phase of fractional crystallization processes and more particularly to the generation of free convection currents to achieve solution mixing in those zone-melting processes where mechanical stirring is not feasible. The benefits of this invention will be widely realized as zone-melting has found valuable application in research and manufacture for purifying metals, semiconductors, organic and inorganic chemicals, particularly in the field of solid-state electronics.

By zone-melting is meant that group of processes which achieve the controlled distribution of solutes or soluble impurities in crystalline materials by the slow movement of one or more short molten zones along a relatively lengthy charge of a crude crystalline solid. Each molten zone has two solid-liquid interfaces: a melting interface at the leading edge of the zone and at which the crude solid is melted, and a freezing interface at the trailing edge of the zone at which solid of an altered solute concentration is frozen out. Within the zone, the crude melted solid (a binary solute-solvent system) mixes with the contents of the zone and thus reaches the freezing interface. At the freezing interface solute which lowers the melting point of the solvent is rejected by the freezing solid and remains in the liquid; conversely, solute which raises the melting point of the solvent is accepted at the freezing interface and so accumulates in the solid, consequently lessening its concentration in the liquid. Thus, it is at the freezing interface that the rejection or acceptance of the solute occurs, and as in more conventional fractional crystallization, the efficiency of this distribution is largely dependent on the amount of stirring which is effected in the liquid portion of the system, particularly that liquid in the immediate region of the growing crystal surface.

The distribution of solute in fractional crystallization processes is described by a parameter of the material, the equilibrium distribution coefficient, defined as the ratio of solute concentration in the solid, $C_s$, to that in the adjacent liquid $C_l$, and designated by the symbol $k_0$. The value of $k_0$ is greater or lesser than one, depending on whether the solute raises or lowers, respectively, the melting point of the solvent, and its magnitude may be read from a phase diagram. In actual practice however, and this includes zone-melting, freezing does not occur slowly and liquid mixing is not complete. Under conditions where $k_0$ is greater than one, solute is rejected by the growing crystal faster than it can diffuse into the liquid and a solute-enriched layer thus builds up in the liquid ahead of the freezing interface. Where $k_0$ is less than one a solute-depleted layer builds up in an analogous manner. The concentration of solute freezing out of (or being accepted by) the solid then is affected by the solute concentration in this layer rather than in the bulk of the liquid. The equilibrium distribution coefficient defined above is no longer accurate and instead, an effective distribution $k$ must be determined. This latter coefficient $k$ is similarly equal to the ratio $C_s/C_l$ where $C_s$ is the solute concentration in the solid but where $C_l$ is the solute concentration in the bulk of the liquid.

The relation between these coefficients is described by a model proposed by Burton, Prim and Slichter [J. A. Burton, R. C. Prim, W. P. Slichter, J. Chem. Phys., 21, 1987 (1953)]. In this model it is assumed that a completely stagnant layer of fluid, of thickness $\delta$, resides at the freezing interface which is considered to be stationary, and that the liquid beyond this layer is well mixed. Solute is rejected (or absorbed) at the freezing interface and diffuses through the stagnant layer upstream against the new fluid continually arriving at the freezing interface. Diffusion is the only effective means of transporting solute through this layer, and solute movement is thus impeded in proportion to the thickness of this layer, hereinafter called the diffusion layer. Upon reaching the bulk fluid solute is completely and immediately mixed into the bulk of the zone. At the freezing interface the relationship between solid and liquid concentrations is given by $k_0$, and in the bulk fluid as proportional to the freezing solid by $k$. According to the above model these are related by the following equation:

$$k = \frac{k_0}{k_0 + (1-k_0) \exp\cdot \frac{(-\delta V \rho_s)}{D \rho_l}}$$

where:

$k$ is the effective distribution coefficient,
$k_0$ is the equilibrium distribution coefficient,
$V$ is the rate of growth of the solid (or zone travel rate),
$D$ is the molecular diffusion coefficient of the solute in the liquid,
$\delta$ is the diffusion layer thickness,
$\rho_s$ is the density of the solid, and
$\rho_l$ is the density of the liquid.

It is demonstrable, both in practice and in theory, that convection in the liquid will reduce the thickness of the diffusion layer and thus improve the effective distribution coefficient. For where zone-melting is intended for purification, as in zone-refining, a large $|1-k|$ is desired; thus, the value of $k$ should be increased if $k$ is greater than 1 and decreased if $k$ is less than 1. Either of these variations may be achieved, as shown in the above equation, by a decrease either in growth rate $V$ or in diffusion layer thickness $\delta$. A decrease in diffusion layer thickness however, as accomplished by convection, is preferable since the process may be carried out with greater efficiency without sacrifice of speed. Conversely, where controlled distribution of solutes is the object of zone-melting, as in zone-leveling, and a constant ratio of solute concentration in solid and liquid ($k$) is desired, a reduction in diffusion layer thickness will allow, within permissible limits, a several fold increase in growth rate, thus assuring more rapid production of the desired crystalline material.

Hence, by whatever convenient means possible, the diffusion layer thickness should be reduced. Where forced convection by mechanical stirring, induced current heating, magnetic forces or liquid pumping is not feasible due to limitations imposed by the apparatus or the materials, free convection must be relied upon to effect stirring of the bulk fluid. Heretofore effective free convection, other than that which is normally present to only an insignificant degree, was obtainable only through selection of a particularly shaped molten zone, generally one having a tall, vertical liquid-solid interface.

The present invention provides for the production of free convection which is not only much more effective than that formerly attainable but which is also independent of zone shape. For the reasons described previously, the result of producing such convection is to increase the separation efficiency and/or growth rate in zone-melting processes thereby effecting increased efficiency and a reduction in processing costs.

It is an object of the present invention therefore to increase the separation efficiency of zone-melting processes.

It is another object of this invention to improve zone-melting by providing for an increase in production rate.

It is another object of this invention to reduce the production costs of zone-melting processes.

It is another object of this invention to provide for an advantageous stirring in the molten zone of zone-melting processes.

It is another object of this invention to generate free convection currents within the molten zone of a zone-melting process in order to produce stirring.

It is another object of this invention to reduce the diffusion layer thickness in fractional crystallization procedures of the zone-melting class by producing free convection to effect stirring of the liquid.

Free convection is that fluid motion which is caused by density variations resulting from temperature and/or concentration variations within the fluid as opposed to forced convection which is fluid motion caused by externally induced agitation of the liquid. According to the present invention, a thermal differential is produced within the fluid of the molten zone, particularly near the freezing interface, by the insertion of a foreign body having thermal characteristics differing from those of the liquid. This foreign body, which may be hotter or cooler than the fluid or have a thermal conductivity greater than the fluid, is placed within the zone-melting apparatus so that it passes near the freezing interface. The temperature, and consequently the density of the fluid immediately adjacent this body is made to differ significantly from that of the rest of the fluid and currents due to free convection are thus established.

This foreign body may be of several different types. Examples are an electrical wire or wires located near the freezing interface and heated by the passage of an electrical current, and a tube or coil, similarly positioned, through which is circulated a hot or cold fluid. A particularly advantageous embodiment of this invention, in terms of convenience and magnitude of results obtainable, is that the foreign body be a simple rod or tube and be of a material which has a thermal conductivity greater than that of the fluid, a condition usually met by copper or stainless steel, and which passes into a heat source or sink. Since the recrystallizing solid in the zone-melting process is cooled, this solid itself may serve as a heat sink merely by burying part of the foreign body in the solid. Because this material does conduct heat well, it is cooler than the liquid in which it resides; heat is therefore transferred from the liquid to the rod thus causing the desired temperature differential within the liquid. The container which holds the zone-melting material may itself, in some instances, be adapted to provide the rapid heat conduction. This latter arrangement may be used in conjunction with additional conductors such as axial rods or wires inside the container and running through melt and solid.

With any of these structures, the foreign body should be of a material which does not dissolve in, react with or melt in the components being processed. The temperature difference between this body and the fluid must be sufficient to cause the density difference needed to produce appreciable free convection currents. In some instances a fraction of a degree of temperature difference within the fluid will be effective. It is preferable, however, to have the temperature difference as large as possible within the following limits: if this body is hotter than the surrounding fluid, it must not be so hot as to vaporize the liquid, cause the zone to expand appreciably in size or cause thermal degradation of the liquid; if this body is cooler than the liquid, it must not be cool enough to freeze an appreciable amount of liquid around it. In the case where the foreign body is cooled by thermal conduction a conductivity at least several times that of the fluid is generally preferable.

The foreign body must be positioned within the zone-melting tube so that at least part of it is always near enough to the freezing interface that the convection currents which are generated will impinge on the freezing interface, or draw fluid from the neighborhood of this interface. Since the freezing interface does traverse the solid charge, due to zone movement, the most convenient method to accomplish this is to position the foreign body axially within the zone-melting tube and to extend it for at least as great a length as the zone is expected to travel. This assures the maintainance of an effective contact between the foreign body and the freezing interface for the duration of the zone-melting treatment.

This foreign body is distinct from that apparatus, such as immersion heaters, heat transfer tubes and the like, which is immersed in the charge in order to create the molten zone. As it is the function of such apparatus to provide the heat necessary to melt the surrounding material, such apparatus will necessarily be positioned in the center of the molten zone rather than very near the freezing interface and the convection currents so generated will not be effective for lessening the diffusion layer thickness as is accomplished by the present invention.

The effectiveness of the foreign body is found by determining the diffusion layer thickness and the solute separation achieved in a zone-melting run performed without the presence of a foreign body and again finding these values under duplicate design conditions but where a foreign body is included. A comparison of these values will show the reduction in diffusion layer thickness and the proportional increase in either solute separation or travel rate which has been attained.

The interdependence of the solute separation or travel rate and diffusion layer thickness is shown in the several equations which have been derived for expressing zone-melting results. For example, in zone-refining the total separation of solute (impurity) caused by a single zone passage down a very long charge is given by the equation:

$$S_t = \int_0^\infty |C_s - C_o| dz = LC_o |(1/k_0) - 1| \exp\left(-\frac{\delta V \rho_s}{D \rho_l}\right)$$

where $S_t$ is total separation (total mass in g./cm.² of solute removed from or added to a crystal of unit cross sectional area),
$C_s$ is the solid solute concentration at $z$,
$C_o$ is the originally uniform solid solute concentration throughout the charge,
$z$ is the distance traveled by the zone,
$L$ is the length of the zone, and
$k_0$, $\delta$, $V$, $D$, $\rho_s$ and $\rho_l$ are as previously defined.

From the foregoing expression, it will be apparent that a reduction in diffusion layer thickness $\delta$ will effect a comparable increase in separation $S_t$ especially at a high zone travel rate $V$ and conversely, in zone-leveling, the zone travel rate may be increased by the same factor by which the diffusion layer thickness is reduced to maintain the same separation.

Figure 2:
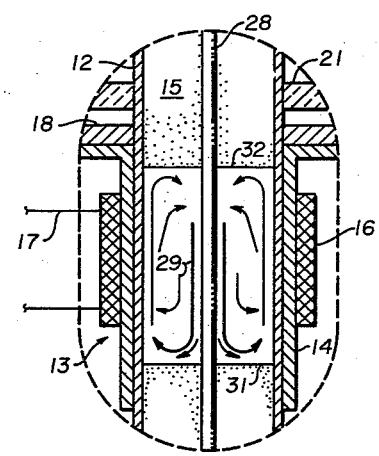

The invention may be more readily understood by reference to the accompanying drawing of which FIGURE 1 is a longitudinal section view of one form of zone-melting equipment employing the present invention, and FIGURE 2 is an enlarged view of the portion of FIGURE 1 enclosed by dashed line 2 thereon and showing the convection currents produced by the present invention, and to the example which describes the essentials of a zone-melting operation utilizing the present invention.

The apparatus shown in FIGURE 1 illustrates the application of the invention to one particular form of zone-melting equipment. Applicant's invention however is not limited to this specific arrangement but may be adapted, by those skilled in the art, to the various other equipment setups presently in use where stirring by free convection may be desirable.

Referring now to FIGURE 1 there is shown a closed hollow upright cylindrical vessel 11 comprising the main body, or zone chamber, of this apparatus. Coaxially disposed within cylinder 11 is a much smaller sealed tubular container 12 filled with the crude material 15 to be processed. Closely encircling container 12 but not affixed thereto is a stationary annular heater 13, but in this instance a resistance heater comprising a tube 14 of a heat conducting material about which is wound a heating tape 16. Leads 17 from an electrical power supply provide the heating current to tape 16. A cylindrical housing 18 is disposed within cylinder 11 surrounding heater 13 to form the heating chamber. Disposed coaxially around the cylinder 11, immediately above and below heater housing 18, are hollow annular cooling chamber housings 19 and 19' through which are circulated coolants at a temperature sufficient to effect freezing of the zone-melted material 15. A pair of disc-shaped insulating shields 21 and 21' are disposed coaxially within cylinder 11 above and below the heater housing 18, the shields each having a central opening through which tube 12 passes. In addition to providing heat insulation around housing 18 these shields also serve as guides to keep tube 12 centered in its movement through the heating and cooling chambers. Movement of tube 12 is effected by means of a shaft 22 one end of which is attached to a cap 23 fitted over the top of tube 12. Rod 22 is transpierced through the top of cylinder 11 through a bushing 24. A chain 26 is secured to the outer end of rod 22 to draw the tube 12 upwardly, the chain being engaged on a pulley 25 driven by a constant speed electrical motor 30 through a speed reducing gear box 27.

The desired thermal differential within the molten zone of material 15 is provided by foreign body 28 positioned axially within tube 12. In this embodiment, the foreign body comprises a long hollow tube 28 of a highly conductive, non-reactive material such as stainless steel and has an outer diameter small in comparison to the inner diameter of tube 12 and a length substantially the same as that of tube 12. The length of foreign body 28, which length corresponds to the total zone travel length, thus assures effective contact between this body and the freezing interface for the duration of the zone-melting run.

Referring now to FIGURE 2, which is an enlargement of the area shown within the dashed line 2 of FIGURE 1, there is shown the effect of the foreign body 28 in the molten zone. Shown in FIGURE 2 are tubular container 12 filled with the crude material 15 to be processed, heater 13 comprised of tube 14, heating tape 16 and leads 17, the lower extremity of heating chamber 18, insulating shield 21 and foreign body 28, each of the elements being as hereinbefore described. Free convection currents, indicated by arrows 29, are generated within the molten zone bounded by freezing interface 31 and melting interface 32, such currents being directed downwardly in the cooled region adjacent body 28 and upwardly in the hotter region more adjacent to the wall of tube 12. The presence of these currents and their intensity and direction of movement may be made visible by mixing into the crude material 15 a finely divided substance insoluble in at least one of the crude components; for this demonstration, aluminum lactate powder was mixed into naphthalene/beta-napthol prior to zone-melting this material. Currents 29 in the present embodiment impinge on the area of the freezing interface 31 and subsequently move through the molten material in the direction of melting interface 32. As previously explained, solute rejected at the growing crystal at the freezing interface is thus transported away from this area which is the desired result.

The desired convection currents may be established by means other than the specific structure described above. The hollow tubular foreign body 28 may be replaced, for example, by a solid rod of conductive material, by an electrically heated element or a refrigerated element. Similarly a plurality of thermal conductors may be utilized and the conductor, or conductors, need not necessarily have the axial positioning as described herein.

The present invention may be more readily understood by reference to the following example which describes the essentials of a zone-melting operation utilizing a foreign body within the molten zone and is performed in equipment such as that described above.

*Example*

To demonstrate the effectiveness of the invention a crude material of predetermined composition was prepared and subjected to a single zone pass operation. A 10% by weight mixture of beta-naphthol in naphthalene was melted and poured into a glass tube twelve inches long and having an internal diameter of 0.69 inch. This corresponds to tube 12 shown in FIGURE 1. A stainless tube of the same length and having a ⅛ inch outside diameter and a 1/64 inch wall thickness served as foreign body 28 and was disposed axially in the still molten beta-naphthol/naphthalene mixture which was then allowed to freeze. A zone chamber and accessory equipment were assembled as shown in FIGURE 1 to supply the essential heating, cooling and movement; the dimensions and materials of construction employed are not critical except to insure steady and measurable heat transfer and movement of tube 12. Filled tube 12 was placed inside the zone chamber and connected remotely to means exerting a vertical pull. During operation this tube was pulled upward at the rate of 0.18 inch per hour. Tap water at about 20° C. served as a coolant for one chamber while a mixture of approximately 50% by weight ethylene glycol in water at 35° C. was circulated through the other cooling chamber. The ½ inch wide heating tape heater produced a molten zone 0.87 inch in length. Tube 12 was pulled once through the zone chamber so that substantially all the contents thereof were zone-refined under the above described conditions. At the end of this operation tube 12 was removed from the zone chamber assembly and broken away from the solid container therein. In turn, the stainless steel tubular foreign body was removed by breaking the solid away from it. A spectrophotometric analysis of the solid was performed and it was determined that this single-pass zone refining run had removed 0.67 gram of naphthalene from the recrystallized material and that the diffusion layer was 0.02 inch thick. Calculations based on an experiment carried out under the similar conditions but without the presence of a foreign body showed a naphthalene removal of only 0.38 gram and a diffusion layer thickness of approximately 0.06 inch.

Comparison of these results shows that the inclusion of a stainless steel tube has reduced the diffusion layer thickness by a factor of three and allowed a 75% increase in separation. Similar benefits, in terms of increased production rate (zone travel rate), are realized in zone-leveling runs where the separation is held constant.

What is claimed is:

1. In the method of zone-melting wherein a molten zone is moved through a solid volume of a fusible substance which is disposed within a long container, the improvement comprising effecting stirring by free convection in said molten zone near the freezing interface thereof, said free convection being provided by disposing a heat conducting foreign body along substantially the entire length of said solid volume of said subtsance, said body being extended within said container along the direction of movement of said molten zone and through the region to be traversed by said freezing interface, said foreign body being formed of a material which is chemically stable in said molten zone and being maintained at a temperature differing from that of said molten zone.

2. In the method of zone-melting wherein a molten zone is moved through a solid volume of a fusible substance disposed within a container, the improvement comprising reducing the diffusion layer thickness which resides at the freezing interface of said molten zone, said reduction being accomplished by providing a long heat conducting foreign body within said solid volume of said substance which body continuously extends through the region thereof to be traversed by said molten zone and which is formed of a material non-reactive with that of said molten zone, said foreign body being aligned along the direction of movement of said molten zone within said container and having a thermal conductivity differing from that of the molten zone.

3. In apparatus for performing zone-melting processes, the combination comprising a container for holding a solid volume of a substance to be processed, a heating element for producing a molten zone within said solid volume of a substance, means for producing a relative movement between said container and said heating element to move said molten zone through said solid substance, and a heat conductive body extending through a region of said substance which is traversed by said molten zone and the freezing interface thereof, said body being within said container and within said volume of substance and being aligned along the direction of movement of said molten zone and extended through substantially the entire length of said volume of substance, said heat conductive body being formed of a material which is chemically stable within said molten zone and being maintained at a temperature differing from that of the molten zone whereby convection currents are established therein.

4. The apparatus as described in claim 3 wherein said heat conductive body is a long rod extending substantially through said volume of said substance and being comprised of a material having a thermal conductivity greater than that of said substance within said molten zone.

References Cited by the Examiner
UNITED STATES PATENTS 2,739,045   3/56   Pfann _____ 23—223.5
2,890,940   6/59   Pfann _____ 23—301

OTHER REFERENCES

"Zone Melting" by Pfann, John Wiley & Sons, Inc., N.Y., pages 63 to 65, 74 to 76, April 18, 1958.

NORMAN YUDKOFF, *Primary Examiner.*
MAURICE BRINDISI, *Examiner.*